(12) United States Patent
Oputa

(10) Patent No.: US 11,137,570 B1
(45) Date of Patent: Oct. 5, 2021

(54) REFLECTION ASSEMBLY

(71) Applicant: Ijomah Joseph Oputa, Santa Monica, CA (US)

(72) Inventor: Ijomah Joseph Oputa, Santa Monica, CA (US)

(*) Notice: Subject to any disclaimer, the term of this patent is extended or adjusted under 35 U.S.C. 154(b) by 53 days.

(21) Appl. No.: 16/799,489

(22) Filed: Feb. 24, 2020

(51) Int. Cl.
*G02B 5/08* (2006.01)
*G02B 7/182* (2021.01)

(52) U.S. Cl.
CPC ............ *G02B 7/1821* (2013.01); *G02B 5/08* (2013.01)

(58) Field of Classification Search
CPC .............................. G02B 5/08; G02B 7/1821
USPC ........................................ 359/855, 856, 857
See application file for complete search history.

(56) References Cited

U.S. PATENT DOCUMENTS

| | | | | |
|---|---|---|---|---|
| 1,748,837 A * | 2/1930 | Greensfelder | ............ | B60R 1/10 359/863 |
| 2,250,896 A * | 7/1941 | Stokesbary | ............... | B60R 1/10 359/862 |
| 2,697,379 A * | 12/1954 | Walker | ............... | G02B 17/0816 359/365 |
| 4,268,120 A * | 5/1981 | Jitsumori | ................. | B60R 1/10 248/483 |
| 5,130,856 A * | 7/1992 | Tichenor | ............. | G02B 17/023 359/857 |
| 5,644,443 A * | 7/1997 | Hung | ..................... | B60R 1/002 359/856 |
| 5,751,490 A * | 5/1998 | Johnson | .................. | B60R 1/085 359/605 |
| 6,012,819 A * | 1/2000 | Pai | ............................ | B60R 1/10 248/479 |
| 6,247,821 B1 * | 6/2001 | Brewster | .................. | B60R 1/10 359/841 |
| 6,293,681 B1 * | 9/2001 | Frank | .................. | G02B 27/028 359/871 |

* cited by examiner

*Primary Examiner* — Ricky D Shafer
(74) *Attorney, Agent, or Firm* — Plager Schack LLP; Mark H. Plager; Michael J. O'Brien

(57) ABSTRACT

A reflection assembly is configured to reflect a three dimensional image in two planes. The reflection assembly has a housing that further has a back wall joined to a top wall, and a bottom wall. A first frame is rotatably joined to the top wall and the bottom wall. The first frame further comprises a first frame major axis and a first frame minor axis. A first mirror is joined to the first frame. A second frame is rotatably joined to the top wall and the bottom wall. The second frame further comprises a second frame major axis and a second frame minor axis. A second mirror is joined to the second frame. An intersection angle is formed by the first frame minor axis and the second frame minor axis is about eighty degrees measured counterclockwise from the first frame minor axis to the second frame minor axis.

5 Claims, 2 Drawing Sheets

REFLECTION ASSEMBLY

BACKGROUND

The embodiments herein relate generally to devices that reflect images.

Prior to embodiments of the disclosed invention, when a regular mirror was used to observe oneself, only a single inverted image was visible that offered a limited view. Further observation required one to move from one side to the other. Embodiments of the disclosed invention solve this problem.

SUMMARY

A reflection assembly is configured to reflect a three dimensional image in two planes. The reflection assembly has a housing that further has a back wall joined to a top wall, and a bottom wall. A first frame is rotatably joined to the top wall and the bottom wall. The first frame further comprises a first frame major axis and a first frame minor axis. A first mirror is joined to the first frame. A second frame is rotatably joined to the top wall and the bottom wall. The second frame further comprises a second frame major axis and a second frame minor axis. A second mirror is joined to the second frame. An intersection angle is formed by the first frame minor axis and the second frame minor axis is about eighty degrees measured counterclockwise from the first frame minor axis to the second frame minor axis.

In some embodiments, a first bearing is arranged through the bottom wall and joined to the first frame with a first dowel. The first dowel further comprises a first dowel central axis that is colinear with the first frame major axis. A second bearing is arranged through the bottom wall and joined to the second frame with a second dowel. The second dowel further comprises a second dowel central axis that is colinear with the second frame major axis.

In some embodiments, a first opening is arranged through the top wall. A first adjustment knob is joined to the first frame with a first upper dowel through the first opening. The first dowel further comprises a first dowel central axis that is colinear with the first frame major axis.

In some embodiments, a second opening is arranged through the top wall. A second adjustment knob is joined to the second frame with a second upper dowel through the second opening. The second dowel further comprises a second dowel central axis that is colinear with the second frame major axis.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
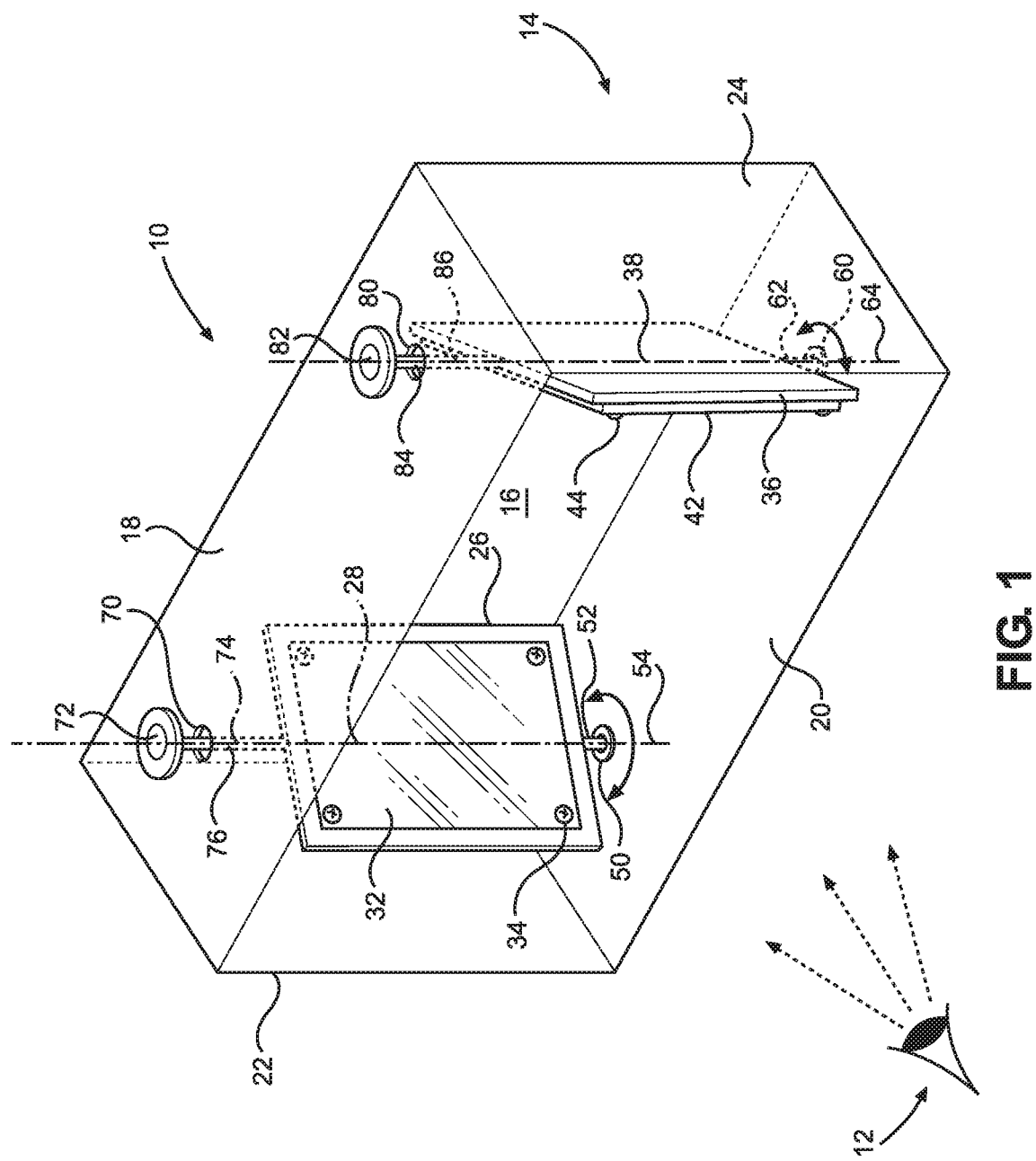
FIG. 1 shows a perspective view of one embodiment of the present invention.
Figure 2:
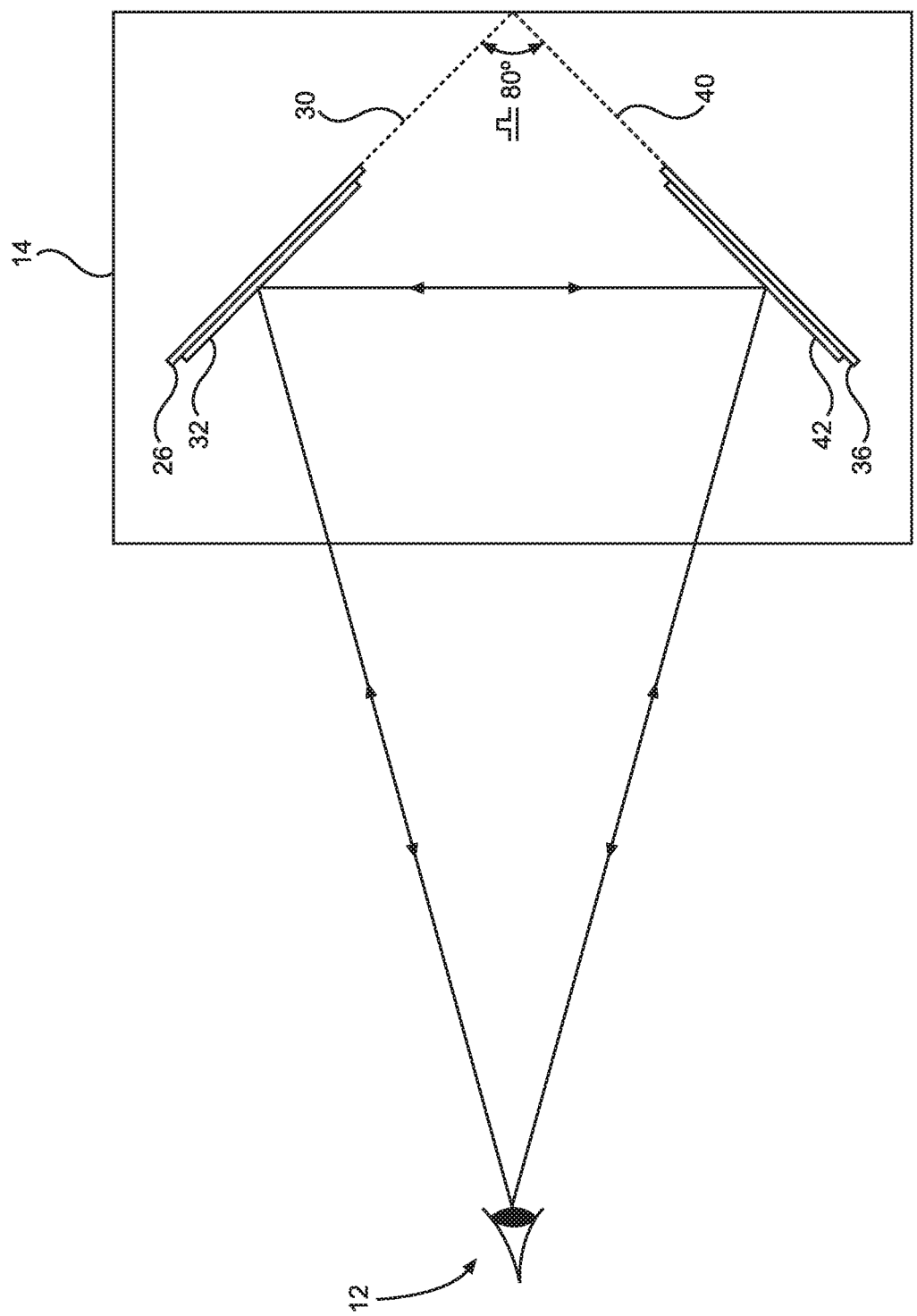
FIG. 2 shows a perspective view of one embodiment of the present invention.

By way of example, and referring to FIG. 1, one a reflection assembly 10 is configured to reflect and three dimensional image 12 in two planes. The reflection assembly 10 has a housing 14 that further comprises a back wall 16 joined to a top wall 18, a bottom wall 20, a first side wall 22 and a second side wall 24.

A first frame 26 is rotatably joined to the top wall 18 and the bottom wall 20. The first frame 26 further comprises a first frame major axis 28 and a first frame minor axis 30. A first mirror 32 is joined to the first frame 26 with a plurality of first mirror fasteners 34.

A second frame 36 is rotatably joined to the top wall 18 and the bottom wall 20. The second frame 36 further comprises a second frame major axis 38 and a second frame minor axis 40. A second mirror 42 is joined to the second frame 36 with a plurality of second mirror fasteners 44.

An intersection angle is formed by the first frame minor axis 30 and the second frame minor axis 40. The intersection angle can be measured counterclockwise from the first frame minor axis 30 to the second frame minor axis 40. In some embodiments, the intersection angle can be at least sixty degrees and less than ninety degrees. Preferably, the intersection angle can be at least seventy-five degrees and no more than eighty-five degrees. At about eighty degrees, the mirrors reflect both the other mirror and the three dimensional object which creates the reflection in two planes.

A first bearing 50 is arranged through the bottom wall 20 and is joined to the first frame 26 with a first dowel 52. The first dowel 52 further comprises a first dowel central axis 54 that is colinear with the first frame major axis 28. A second bearing 60 is arranged through the bottom wall 20 and joined to the second frame 36 with a second dowel 62. The second dowel 62 further comprises a second dowel central axis 64 that is colinear with the second frame major axis 38.

A first opening 70 is arranged through the top wall 18. A first adjustment knob 72 is joined to the first frame 26 with a first upper dowel 74 through the first opening 70. The first upper dowel 74 further comprises a first upper dowel central axis 76 that is colinear with the first frame major axis 28.

A second opening 80 is arranged through the top wall 18. A second adjustment knob 82 is joined to the second frame 36 with a second upper dowel 84 through the second opening 80. The second upper dowel further comprises a second upper dowel central axis 86 that is colinear with the second frame major axis 38.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A reflection assembly, configured to reflect a three dimensional image in two planes; the reflection assembly comprising:
   a housing further comprising a back wall, joined to a first side wall, a second side wall, a top wall, and a bottom wall;
   a first frame, rotatably joined to the top wall and the bottom wall; wherein the first frame further comprises a first frame major axis and a first frame minor axis;
   a first mirror, joined to the first frame;
   a second frame, rotatably joined to the top wall and the bottom wall; wherein the second frame further comprises a second frame major axis and a second frame minor axis;
   a second mirror, joined to the second frame;
   an intersection angle, formed by the first frame minor axis and the second frame minor axis is at least 75 degrees but no more than 85 degrees measured counterclockwise from the first frame minor axis to the second frame minor axis.

2. The reflection assembly of claim 1, further comprising a first bearing arranged through the bottom wall and joined to the first frame with a first dowel wherein the first dowel further comprises a first dowel central axis that is colinear with the first frame major axis.

3. The reflection assembly of claim 2, further comprising a second bearing arranged through the bottom wall and joined to the second frame with a second dowel wherein the second dowel further comprises a second dowel central axis that is colinear with the second frame major axis.

4. The reflection assembly of claim 3, further comprising a first opening arranged through the top wall;
   a first adjustment knob, joined to the first frame with a first upper dowel through the first opening;
   wherein the first dowel further comprises a first dowel central axis that is colinear with the first frame major axis.

5. The reflection assembly of claim 4, further comprising a second opening arranged through the top wall;
   a second adjustment knob, joined to the second frame with a second upper dowel through the second opening;
   wherein the second dowel further comprises a second dowel central axis that is colinear with the second frame major axis.

* * * * *